Nov. 27, 1923.

G. A. TAYLOR 1,475,660

PROCESS OF MAKING PISTON RINGS

Filed Sept. 29, 1921

INVENTOR:
George A. Taylor,
by Macleod, Calvi, Copeland & Dike
Attys.

Patented Nov. 27, 1923.

1,475,660

UNITED STATES PATENT OFFICE.

GEORGE A. TAYLOR, OF BOSTON, MASSACHUSETTS.

PROCESS OF MAKING PISTON RINGS.

Application filed September 29, 1921. Serial No. 504,166.

*To all whom it may concern:*

Be it known that I, GEORGE A. TAYLOR, citizen of the United States, residing at Boston, county of Suffolk, State of Massachusetts, have invented a certain new and useful Improved Process of Making Piston Rings, of which the following is a specification, reference being had therein to the accompanying drawings.

My invention has for its object an economical, accurate and efficient method of making the novel piston rings shown and described in my prior application for Letters Patent of the United States, filed February 10, 1921, Serial No. 444,055. The piston ring shown in said application consists essentially in a ring having integral spring members formed on a flat face of the ring as distinguished from a cylindrical or peripheral face. For the best operation of the rings in combination with the pistons and cylinders with which they are to be used, it is essential that the thickness of the rings measured through the spring members should be uniform and of a predetermined amount. It is also important that the pressure exerted by the ring on the top and bottom faces of the ring groove in the piston shall be of a predetermined amount and substantially the same for all rings intended to be identical.

The herein described invention furnishes a satisfactory method of producing piston rings fulfilling these conditions.

The invention will be fully understood from the following description when taken in connection with the accompanying drawings, and the novel features thereof may be pointed out and clearly defined in the claims at the close of this specification.

Figure 1:
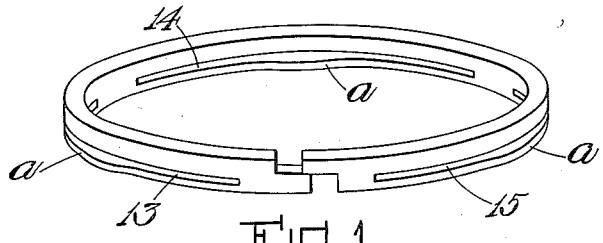

In the drawings, Fig. 1 is a view in perspective of a finished piston ring to be produced by the process claimed herein.

Figs. 2, 3, 4 and 5 illustrate successive steps in my preferred method.

Figure 2:
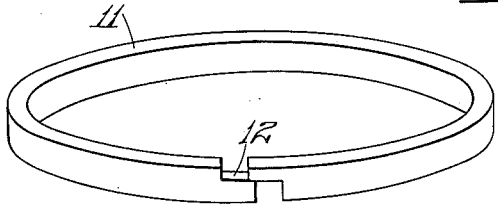
Figure 3:
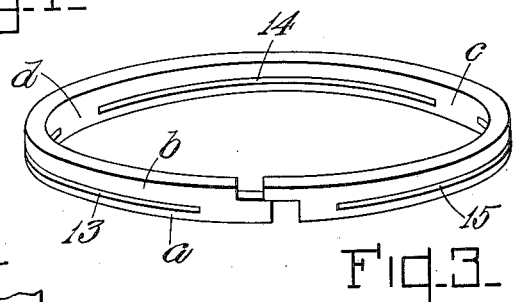
Figure 4:
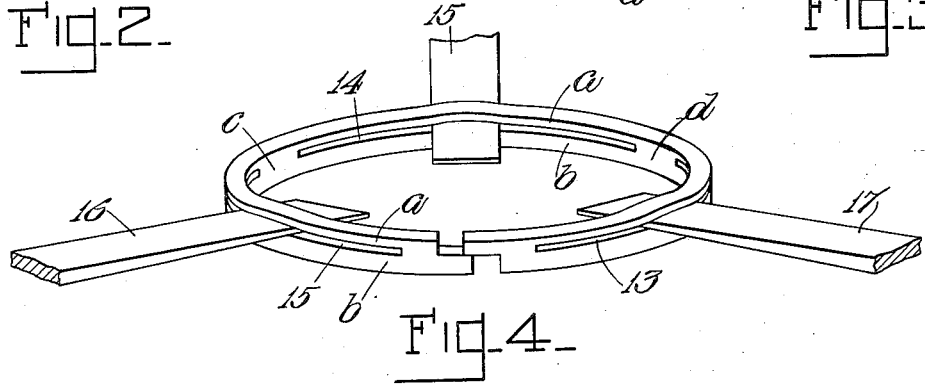
Figure 5:
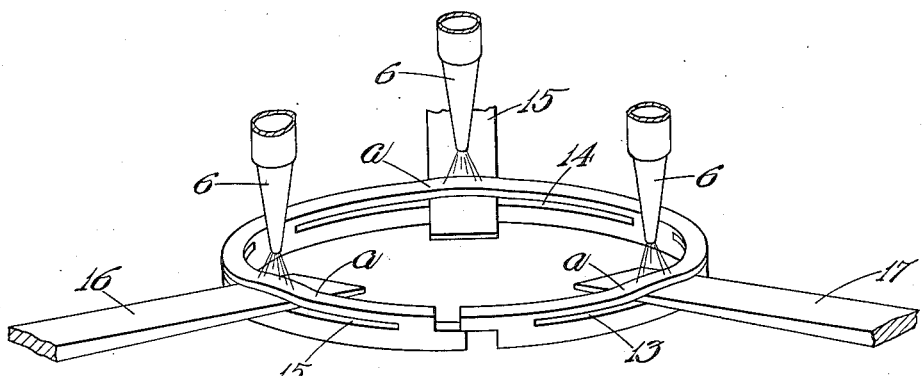

Referring now to the drawings, there is shown in Figure 2 a piston ring before the beginning of the process embodying my invention in its preferred form. This ring 11 is a one-piece ring of ordinary construction and may be either concentric or eccentric. The joint shown at 12 is the ordinary rabbeted or step joint but any desired joint may be employed. Figure 3 illustrates the first step in the process. This consists in slitting the ring as shown at 13, 14 and 15. The number and arrangement of the slits will be determined by the particular conditions of use for which the ring is intended. The slits are so placed that one wall, as for instance the wall $a$, is thinner than the other wall $b$; in other words, the slits are placed nearer to one face than the other. The portions of the ring at the ends of the slits, as for instance $c$ and $d$, are unslitted and solid.

The second step in the process embodying my invention is to elongate the metal composing one of the walls adjacent the slit, preferably the thin wall $a$. This may be done by any convenient method but I find that the most satisfactory way is to insert a wedge in the slit forcing it in until the slit has been opened to a predetermined amount. The amount of elongation can easily be regulated by limiting the inward movement of the wedge, either by the skill of the operator or by suitable mechanical devices. In practice I find it convenient to open all the slits simultaneously, a series of wedges 15, 16 and 17, one for each slit, being moved inwardly radially while the ring is held properly in place. Since the wall $b$ adjacent the slit is much thicker and heavier than the wall $a$, the action of the wedge is to stretch or elongate the portion $a$, of the metal between the solid portions of the ring so that they assume a slight curve or bow-shape while the ring as a whole remains flat. It will be understood that this elongation is very small since the amount of opening of the ring is very slight. In the drawings this has been somewhat exaggerated for clearness of illustration.

The next step in the process is to set or render permanent the elongation or a sufficient amount of it to give to the spring the requisite resistance to compression in a line parallel to the axis of the piston with which the ring is to be used. In practice I heat the portions of the member $a$ of the ring while the slit is still opened by the wedge, the heat being sufficient to affect the molecular arrangement of the metal throughout the area to which the heat is applied. In practice I find it convenient to use an oxyhydrogen or acetylene burner, and I heat the portion of the member immediately over the wedge to redness allowing it to cool to blackness before the wedge is removed. In actual practice I find it convenient to have a burner 6 over each of the wedges and to apply the heat simultaneously to the several portions of the ring, removing the burners when the color of the metal has changed from black to red. As soon as the heated portions of the ring have cooled to blackness, the wedges are withdrawn and it will be found that the ring will have been given the necessary set so that it will form a spring.

While I have described the use of wedges and the employment of heat, due to direct combustion, as instrumentalities for use in performing the successive steps of my improved process, I do not limit myself to them as it will be apparent that other equivalent methods or instrumentalities may be employed. For instance, heat may be produced by electrical means and the elongation accomplished by pulling apart the portion of the rings, or the set may be produced by hammering or other equivalent methods.

What I claim is:

1. The process of making piston rings which consists in slitting the ring circumferentially and permanently elongating the metal adjacent one side of the slit.

2. The process of making piston rings which consists in slitting the ring circumferentially and stretching the metal adjacent one side of the slit to elongate it.

3. The process of making piston rings which consists in slitting the ring and then separating the sides of the slit to elongate one of them.

4. The process of making piston rings which consists in slitting the ring to leave a relatively thick member and a relatively thin member and permanently elongating the thin member.

5. The process of making piston rings which consists in slitting the ring circumferentially, then elongating the metal adjacent one side of the slit, and then heating it to render the elongation permanent.

6. The process of making piston rings which consists in slitting the ring then wedging the sides apart to elongate one of the side members, and then applying heat while the sides are still wedged apart to render the elongation permanent.

7. The process of making piston rings which consists in slitting the ring, then elongating the metal adjacent one side only of the slit, and then heating a portion of the said metal to render the elongation permanent.

8. The process of making piston rings, which consists in slitting the ring at a plurality of points, then simultaneously inserting wedges in the slits radially of the ring to open the slits, and then heating the metal adjacent the wedges to redness before withdrawing the wedges.

9. The process of making piston rings which consists in slitting the ring, elongating the wall of the ring adjacent one side only of the slit and heating the middle portion of the elongated side to render the elongation permanent.

In testimony whereof I affix my signature.

GEORGE A. TAYLOR.